United States Patent

Kaneko et al.

[15] 3,678,829
[45] July 25, 1972

[54] AUTOMATIC FLASH SELECTION DEVICE FOR CAMERAS

[72] Inventors: Hirokazu Kaneko, Tokyo, Japan; Ricoh Co., Ltd., Tokyo, Japan

[22] Filed: Dec. 17, 1970

[21] Appl. No.: 98,991

[30] Foreign Application Priority Data

Dec. 18, 1969 Japan..................................44/101259

[52] U.S. Cl..............................95/11 R, 95/10 C, 95/11.5 R, 95/64 A
[51] Int. Cl...................G03b 15/03, G03b 7/08, G03b 7/14
[58] Field of Search..............95/11 R, 10 C, 64, 64 A, 11.5 R

[56] References Cited

UNITED STATES PATENTS

| | | | |
|---|---|---|---|
| 3,400,646 | 9/1968 | Kiper et al | 95/64 R |
| 3,464,333 | 9/1969 | Aoki et al | 95/64 R |
| 3,498,192 | 3/1970 | Ito et al. | 95/11 R |
| 3,500,731 | 3/1970 | Bresson et al. | 95/64 R |
| 3,529,524 | 9/1970 | Ueda | 95/64 A |
| 3,555,985 | 1/1971 | Ueda | 95/10 C |

*Primary Examiner*—Samuel S. Matthews
*Assistant Examiner*—Robert P. Greiner
*Attorney*—Henry T. Burke, Robert Scobfy, Robert S. Dunham, P. F. Henninger, Lester W. Clark, Gerald W. Griffin, Thomas F. Moran, R. Bradlee Boal and Christopher C. Dunham

[57] ABSTRACT

An automatic flash selection device for use with fully automatic exposure setting cameras comprising an exposure meter pointer, stopper plate and a coacting detector plate which are displaced in response to the actuation of the shutter release, a distance proportional to the angle of rotation of the pointer in that the plates are blocked during their displacement by the pointer when its angle of rotation is less than a predetermined angle, but are displaced to the full length of their strokes when the angle is beyond a predetermined angle; a pivoted first lever coupling the detector plate and the shutter stop mechanism; a pivoted intermediate lever rotated by the first lever and coupled to the shutter speed selection lever; a focusing cam operated by the focusing mechanism and a pivoted third lever abutting the intermediate lever and the shutter stop mechanism. When there is adequate light on the subject, the first lever controls the shutter stop mechanism in response to the proportional displacement of the detector plate. However, when there is insufficient light, the detector and stopper plate will pass through their full displacement, rotating the first and intermediate levers through a greater range, such that the third lever is disconnected from engagement with the intermediate lever and switches control of the shutter stop mechanism from the first lever to the focusing cam, while the stopper plate actuates a warning light in the flash equipment and the shutter speed selection lever is moved to a position causing the shutter speed mechanism to be operated at a low shutter speed. Thus, when the flash is to be used, the shutter stop mechanism is under the control of the focusing mechanism and the shutter speed is appropriately lowered.

1 Claim, 4 Drawing Figures

PATENTED JUL 25 1972 3,678,829

3,678,829

AUTOMATIC FLASH SELECTION DEVICE FOR CAMERAS

BACKGROUND OF THE INVENTION

The present invention relates to an automatic flash selection device for use with a fully automatic exposure setting camera having a built-in socket for a flash light source such as a flash bulb, flash cube and the like, said device being capable of automatically selecting either the automatic exposure setting or the flash exposure setting in response to the brightness of a subject.

Cameras are known having built-in flash equipment and associated devices drivingly coupled to a focusing ring or the like and to an aperture ring for automatically setting the aperture stop in accordance with the distance between the subject and the camera by means of previously setting a guide number of a flash light source to be used. In addition there has been proposed an automatic flash selection device incorporated in a fully automatic exposure camera having a built-in exposure meter, in which device the difference in the amount of the displacements of a pointer stopper plate which is moved to engage the pointer of the exposure meter is detected and used to automatically setting the camera to a low shutter speed exposure while opening or closing a power source circuit for a previously loaded flash light source. The aperture stop is set by the exposure meter pointer when the power source circuit is opened and when the power source circuit is closed the aperture stop is set by a focusing member. However, the conventional devices of the type described above are complicated in construction, expensive to manufacture and unreliable in operation.

SUMMARY OF THE INVENTION

According to the present invention a series of interacting pivoted levers is provided wherein the initial actuation range of one lever coupled to an aperture stop setting member and interconnecting a toothed plate which detects the position of the pointer of the exposure meter with an aperture-blade-driving member is defined as the range in which the aperture stop setting is under the control of the automatic exposure setting and the remaining range of the lever is defined as the range under the control of the focusing and aperture stop setting operated with the flash exposure setting.

The toothed plate is coupled to the aperture blade driving lever depending upon the initial displacement of the lever interconnecting the toothed plate for pressing the pointer of the exposure meter and the aperture blade driving lever so that the fully automatic exposure set may be accomplished. In response to the subsequent displacement of the lever, the shutter speed selection lever is moved away from the path of rotation of the shutter blade thereby providing a slow shutter speed while the lever coupled to the focusing ring is engaged with the focusing cam thereby driving the lever coupled to the aperture setting ring so as to set an aperture stop.

The present invention provides therefore a flash selection device simple in construction and reliable in operation.

The present invention becomes more apparent from the description of the preferred embodiment thereof taken in conjunction with the accompanying drawings.

Figure 1:
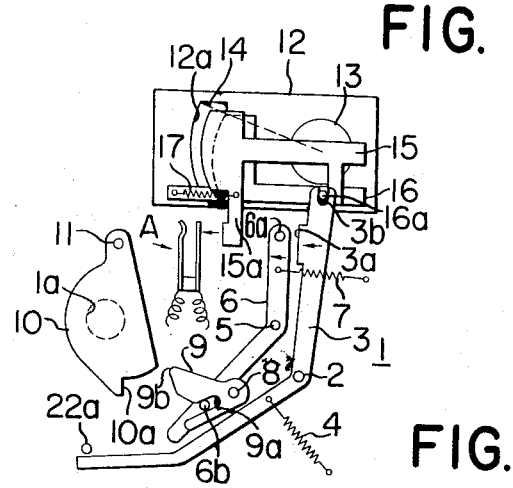
Referring to FIG. 1, a lever 3 coupled to an aperture stop setting member is rotatably mounted to a base 1 in the camera housing by a pin 2 and is provided with a projection 3a and a bifurcated end 3b. A spring 4 is loaded between the lever 3 and the base 1. An intermediate lever 6 having pins 6a and 6b is rotatably pivoted to the base 1 by a pin 5. A spring 7 is loaded between the base 1 and the intermediate lever 6 so as to move the pin 6a toward the projection 3a of the lever 3 while the pin 6b is loosely received in a bifurcated end 9a of a speed-selection lever 9 pivotably mounted to the base by a pin 8. A shutter blade 10 for opening and closing an aperture 1a for a camera lens formed through the base 1 is pivotably mounted to the base 1 by a pin 11. When the shutter blade 10 is rotated in the counterclockwise direction, a stepped portion 10a of the shutter blade 10 engages with the leading end 9b of the speed-selection lever 9. A base 12 of an exposure meter is securely fixed to the upper portion of the base 1 and an arcuate groove 12a whose center is the axis of a meter 13 is formed through the base 12. The upright end of a pointer 14 of the meter 13 is fitted into and extends through the groove 12a during rotation. Both a pointer stopper plate 15 and a toothed plate 16 are mounted to the base 12 by a suitable mechanism consisting of a guide pin and a slot for lateral movement. A relatively weak spring 17 is loaded between the pointer stopper plate 15 and the toothed plate 16. A pin 16a extending from the toothed plate 16 is fitted into the bifurcated end 3b of the lever 3. When the pointer stopper plate 15 is moved to the left in FIG. 1, a projection 15a formed integral with the stopper plate 15 closes a contact A fixed to the base 1.
Figures 2, 3:
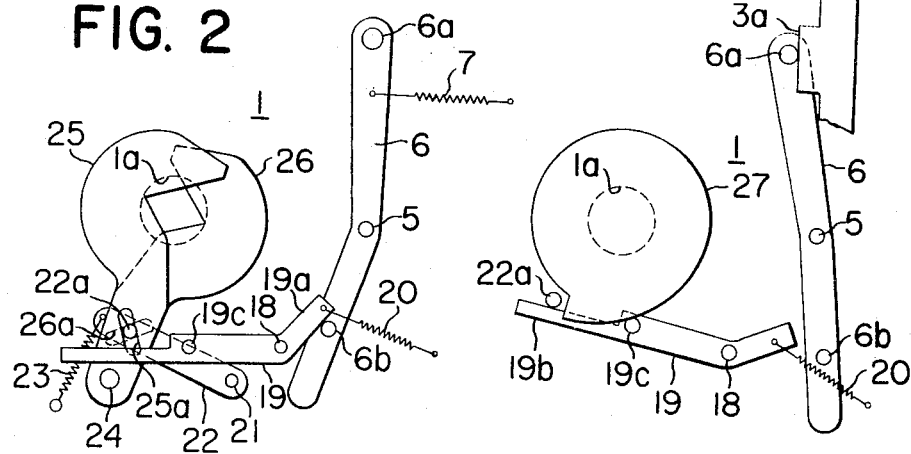
Referring to FIGS. 2 and 3, a lever 19 drivingly interconnected with a focusing ring is pivotably mounted to the base 1 by a pin 18. A spring 20 is loaded between the lever 19 and the base 1 so that one end 19a of the lever 19 may be normally in contact with the pin 6b of the lever 6. A shutter blade driving lever 22 is pivotably mounted to the base 1 by a pin 21 and a spring 23 is loaded between the lever 22 and the base. A pin 22a extending from the lever 22 is fitted into elongated slots 25a and 26a of shutter blades 25 and 26 pivoted to the base 1 by a pin 24 and is in opposed relation with the ends of the levers 3 and 19. A pin 19c extending from the lever 19 may detachably engage with a focusing cam 27 made integral with a focusing ring and rotatable about the optical axis. The forces of the springs 4, 7, 20, and 23 are reduced in order named. That is, the spring 4 is strongest while the spring 23 weakest.
Figure 4:
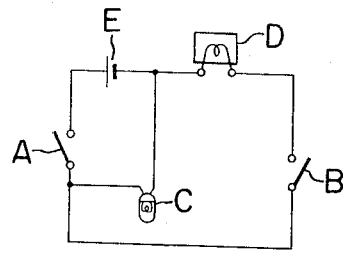
FIG. 4 illustrates the circuit diagram of the instant embodiment. The contact A is closed and opened by a projection 15a on the pointer stopper plate 15; contact B is an X contact which is closed when the shutter is opened; C is a warning lamp; D is a flash lamp or flash light source; and E is a power source.

Next the mode of operation will be described for the case when the brightness of a subject is sufficient to actuate the exposure meter. The lever 3 is set free through an appropriate mechanism (not shown) upon depression of a shutter release button or the like, so that the lever 3 is rotated in the counterclockwise direction by the spring 4. In consequence, the toothed plate 16 is displaced to the left by the coaction of the bifurcated end 3b of the lever 3 with the pin 16a of the toothed plate 16. The pointer stopper plate 15 is also caused to displace toward the left together with the toothed plate 16 under the force of the spring 17 so that the arcuate edge of the stopper plate 15 presses the upstanding end of the pointer 14 against the arcuate edge of the groove 12a of the meter base 12. Thus the displacement of the pointer stopper plate 15 is stopped. When the lever 3 is further rotated, only the toothed plate 16 is displaced further to the left extending the spring 17 a distance proportional to the rotational position of pointer 14 until it is stopped when the toothed portion at the leading end thereof engages with the pointer 14. The rotation of lever 3 in the counterclockwise direction also permits movement of the pin 22a of the driving lever 22 so that the lever 22 is rotated in the counterclockwise direction under the force of the spring 23 thereby opening the blades 25 and 26. When the lever 3 is stopped by engagement of the pointer 14 with plate 16, the blades 25 and 26 are stopped to thereby define the proper aperture stop in response to the angle of rotation of the pointer 14 of the meter 13. In this case, the projection 15a on the pointer stopper plate 15 will not close the contact A so that the flash-light source D is not energized.

The intermediate lever 6 is in a position in which the pin 6a is not in engagement with the lever 3 so that it is free to move somewhat in a clockwise direction under the action of spring 7 and the leading end 9b of the lever 9 is moved within the path of rotation of the shutter blade 10 as viewed from FIG. 1. The shutter blade 10 which is rotated to open by another shutter-blade driving lever (not shown), in response to the depression of the shutter release button, strikes the lever 9 immediately after passing across the aperture 1a and is sprung back. In consequence the shutter blade 10 is returned to its initial position at high speed with the aid of a return spring (not shown), so that a high shutter speed exposure may be attained.

The pin 6b on the other end of the intermediate lever 6 moves into engagement with the one end 19a of the lever 19 causing the lever 19 to rotate the counterclockwise direction against the spring 20 so as to be moved away from the blade driving pin 22a, and avoid engagement of the pin 19c with the focusing cam 27. Therefore the aperture blades 25 and 26 are not driven through the lever 19 when the camera is focused and the aperture stop is controlled only in response to the position of the pointer 14 of the meter 13. Thus the automatic pressure setting is attained.

Next when the brightness of the subject is not sufficient to drive the exposure meter or to cause the pointer 14 to swing into a predetermined range, the upright end of the pointer 14 is moved out of the path of the pointer stopper plate 15 and the toothed plate 16 as viewed from FIG. 1. Then rotation of the lever 3 in the counterclockwise direction under the force of the spring 4 upon the depressing of the shutter release button or the like, causes the pointer stopper plate 15 and the toothed plate 16 to be displaced to the left extremities of their strokes so that the projection 15a of the pointer stopper plate 15 closes the contact A. The warning lamp C is energized giving a warning that flash photography is necessary. The projection 3a of the lever 3 pushes the pin 6a of the intermediate lever 6 so as to rotate the level in the counterclockwise direction against the spring 7. The pin 6b of the intermediate lever 6 is released from engagement with the lever 19 so that the latter is rotated in the clockwise direction under the force of the spring 20, thereby engaging the pin 19c with the stepped portion of the focusing cam 27. In this case the leading end 18b of the lever 19 pushes the pin 22a so as to drive the aperture blades 25 and 26. Since the lever 3 is moved away from the pin 22a, the aperture stop is varied only in response to the operation of the focusing cam when setting a distance between the subject and the camera lens. The pin 6b causes the lever 9 to rotate in the counterclockwise direction so that the leading end 9b is moved away from the path of rotation of the shutter blade 10. In consequence the shutter blade 10 may rotate in the counterclockwise direction until it strikes a stopper (not shown) after it opens the aperture 1a and then may return to its initial position by its own returning force. Thus a lower shutter speed exposure is set. The flash photography may be accomplished by energizing the flash-light source D by closing the contact B.

In one variation of the present invention, a shutter speed may be fixed while the auto- or flash photography may be selected only in response to an aperture stop setting. In this arrangement the construction may be simplified as the lever coupled to the shutter speed dial or ring may be eliminated.

What is claimed is:

1. An automatic flash selection device for use with a fully-automatic exposure setting camera of the type having:
    a. a housing with built-in flash equipment;
    b. an exposure meter with a rotatable pointer;
    c. a shutter speed mechanism;
    d. a shutter stop mechanism;
    e. a focusing mechanism; and
    f. a shutter release;
   wherein the improvement comprises:
    g. a pointer stopper plate;
    h. a detector plate connected to and adapted to be displaced with said pointer stopper plate, in response to the actuation of the shutter release, a distance proportional to the angle of rotation of the pointer of the exposure meter, said plates being blocked during their displacement by said pointer when the angle of rotation of said pointer is less than a predetermined angle and being displaced to the full length of their strokes when the angle of rotation is beyond a predetermined angle;
    i. a first lever rotatably pivoted to the housing and coupled to said detector plate for rotation during the displacement thereof;
    j. a shutter blade driving pin for operating said shutter stop mechanism and adapted to be engaged by and driven under the control of said first lever;
    k. a shutter speed selection lever for controlling the operation of said shutter speed mechanism;
    l. an intermediate lever rotatably pivoted to the housing and adapted to be rotated by said first lever and operatively coupled to said shutter speed selection lever;
    m. a focusing cam operated by said focusing mechanism;
    n. a third level rotatably pivoted to the housing and adapted to engage said intermediate lever and said shutter blade driving pin;
   whereby upon full displacement of said detector plate and stopper plate, said first and intermediate levers are rotated such that said third lever is disconnected from engagement with said intermediate lever so as to switch the engagement of said shutter blade driving pin by said first lever to engagement by said focusing cam thereby putting said shutter stop mechanism under the control of said focusing mechanism while said stopper plate actuates said flash equipment; and said shutter speed selection lever is moved by the rotation of said intermediate lever to a position such that the shutter speed mechanism is operated at a low shutter speed exposure.

* * * * *